United States Patent [19]

DiVelez

[11] 4,423,556
[45] Jan. 3, 1984

[54] ALIGNMENT DEVICE

[76] Inventor: Gilbert J. DiVelez, 117 S. 10th St., Colorado Springs, Colo. 80904

[21] Appl. No.: 272,501

[22] Filed: Jun. 11, 1981

[51] Int. Cl.³ .......................... G01B 3/30; G01B 5/14
[52] U.S. Cl. .................................... 33/180 R; 248/231
[58] Field of Search ............... 33/180 R, 181 R, 21 C, 33/412; 248/231, DIG. 4

[56] References Cited

U.S. PATENT DOCUMENTS

| | | | |
|---|---|---|---|
| 2,634,939 | 4/1953 | Voss | 248/231 |
| 3,525,158 | 8/1970 | Torlay | 33/180 R |
| 3,631,604 | 1/1972 | Schenavar | 33/180 R |
| 3,664,029 | 5/1972 | Glucoft | 33/180 R |
| 4,094,612 | 6/1978 | Krieg | 248/231 X |

*Primary Examiner*—Harry N. Haroian
*Attorney, Agent, or Firm*—Joseph C. Herring

[57] ABSTRACT

An alignment, marking or positioning device is provided by a base, a chain and a retractor. The base is concave on a portion of its lower surface and the chain is rotatably attached to the base of the corner adjacent to the surface. On the other side, the base has a slotted arcuate finger. A hook extends downwardly through the slot and engages the chain when it is placed around a shaft, pipe, chuck or the like. The hook extends through the slot, a semi-circular anchor means which slides within the finger and is snugged by a retractor which may be a knurled knob where a threaded hook shaft is utilized or some form of a camming device. The base is provided with a means for attaching gauge holders, scribes, positioning devices, etc.

6 Claims, 2 Drawing Figures

U.S. Patent  Jan. 3, 1984  4,423,556
FIG. 1
FIG. 2
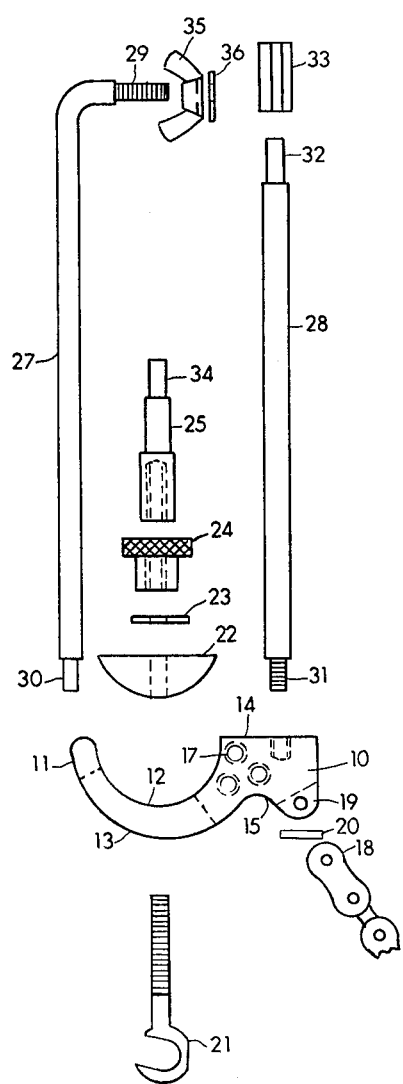
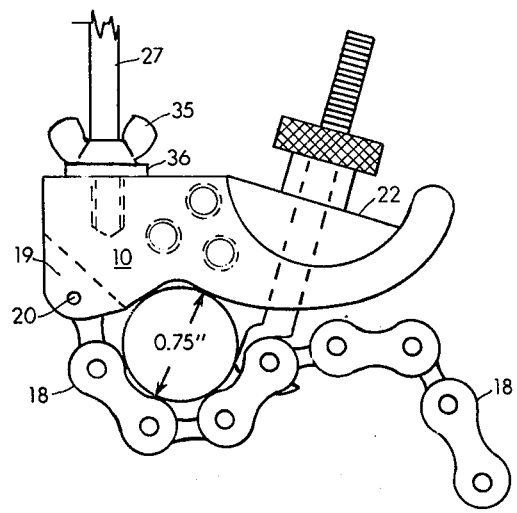

ALIGNMENT DEVICE

Machinery erectors, lathe operators, motor installers and others use alignment devices which are designed to enable the user to attach the device to a motor or generator shaft, lathe chuck or the like, position a material to be worked, or hold a dial gauge in a position to effect perfect alignment of the work piece and the working piece.

The machine aligning device of U.S. Pat. No. 3,733,706 is typical. It aligns driving and driven shafts. A block is mounted on the driving shaft in the described device and is anchored in place with a bicycle type chain. A shaft extends from the block transversely to position the dial gauge. The block is rectangular and has V-shaped seat which is positioned on the driving shaft.

Problems arise in the use of the device because the pointed edges at the intersection between the V-shaped seat and the side of the block bite into large shafts if the operator tightens the machine on the shaft excessively. Additionally, the device does not work well for shafts which have a diameter substantially less than the size of the "V" because of a minimal contact with the chain adjusting means. For these reasons, different block sizes may be needed to handle shafts of greatly different sizes.

In U.S. Pat. Nos. 3,781,999 and 4,208,157, a gauge positioner is shown having the shafts held by a collar. Different sized collars must be used if the erector or repairman is to work with a variety of sizes of shafts, chucks, etc.

In U.S. Pat. No. 4,050,661, a device using a magnetic base is described.

The magnetic base also suffers from disadvantages. The length and weight of the arm holding the dial gauge must be sufficiently small that the magnetic forces maintain the apparatus in firm contact with the surface on which the holder rests. Where the holder is used with round shafts, etc., a number of magnetic bases must be used with changing shaft sizes. The problem is sometimes aggravated when the tool holder is positioned on a vertical shaft.

SUMMARY OF THE INVENTION

The instant invention is a dial gauge or tool positioner having a base, a bicycle chain, a means for pulling the chain tightly against the surface of a shaft, chuck, or the like, and one or more extensions for the positioning of a dial gauge or piece to be worked. The base has, on one side, a slotted, arcuate finger. ON the other side of the base, the upper surface is substantially flat and the lower surface is substantially concave. At the rounded corner between the concavity and the side of the base, a bicycle type chain is rotatably attached. The chain wraps around the shaft, chuck, or the like, and is loosely hooked into a retractor. The hook passes through the slot in the arcuate finger, through an anchor which rotates within the concave portion of the finger when the chain is snugged around a shaft, etc. The snugging is accomplished by a cam, butterfly nut or other retractor means.

The base configuration permits the chain to remain in substantially constant contact with the shaft, etc., because both chain attachments to the base rotate to a position which provides maximum contact. The concave under surface of the base eliminates the scratch marks on the shaft caused by excessively tightening the base of devices like that found in U.S. Pat. No. 3,733,707. The combination of the elements of this invention provide a simple tool which is easily carried in a tool chest, is adaptable to all sizes of shafts, tool holders, chucks, and the like and provides a simple means of coupling into the three most popular dial gauges marketed in the United States. As such, it is the most universally useful tool available.

FIG. 1 depicts an exploded view of the preferred alignment device with all parts displayed.

FIG. 2 depicts the device positioned around a ¾" shaft.

In FIG. 1, the tool base 10 has, on one side, an arcuate finger 11 having a concave upper surface 12 and convex lower surface 13. The finger is slotted, indicated by dash lines. The other side of base 10 has a substantially flat upper surface 14 and a substantial concavity 15 in its lower surface. It has a drilled, threaded hole in its upper surface and a number of horizontally drilled, threaded holes 17 in its lateral surface. Chain 18, which fits into slot 19 indicated by dashed lines, is held in place by pin 20.

The threaded screw portion of hook 21 passes through the slot in finger 11, semicircular anchor 22, washer 23 and knurled, threaded knob 24. Knob 24 is turned to provide a desired tension on chain 18. Short extension 25 is shown as drilled and tapped on its bottom surface and as cut to predetermined thicknesses along its length. L-shaped rod 27 and straight rod 28 extensions are threaded on ends 29 and 31 and are smooth on ends 30 and 32. Coupler 33 is adapted to slip over ends 30 and 32 and the end 34 of short extension 25. Wing nut 35 and washer 36 can be used to lock rods 27 and 28 in place on tool base 10.

FIG. 2 shows tool base 10, chain 18 and hook 21 tightened around a ¾" shaft with a partially cut away rod 27 locked in place by wing nut 35 and washer 36. This embodiment shows how chain 18, anchored by pin 20, in groove 19 and anchor 22 co-act to provide maximum contact between the tool holder and the shaft surface.

The device of this invention is preferably made of steel, but can be made of other materials such as aluminum, various plastics, etc. The hook may be round or flat, but it is preferably flat. All edges on the device are preferably rounded.

In the particular embodiment shown, the tool is useful from shaft, chuck, etc., diameters smaller than shown to diameters which are substantially flat to the tool. The hook may be placed either over or under a chain link and a few turn of the knurled knob provides sufficient grip for most usages.

While the device has been primarily discussed in terms of use with a dial gauge, there is nothing to limit its use with other position indicating devices or positioning devices. Further, it can be used with scribes and other markers. The knurled knob can easily be replaced with a cammed retractor.

Now, having described my invention, what I claim is:
1. A tool comprising
   A. A base having, on one side, an arcuate finger portion with a concave upper surface and an elongated slot cut vertically through a substantial portion of the length of the finger and, on the other side, a second portion with a concave lower surface and an upper and at least one lateral surface adapted for fixed connection to position rod attachment means;
   B. Chain means rotatably connected adjacent the concave lower surface on the lower corner of the second portion and adaptable for insertion into a hooking means moveably positioned through the slot in the arcuate finger portion of the base;
C. Hooking means having a hook portion adapted to receive and hold the chain means within the hook, said hook portion to pass through the elongated slot and an anchor means and for positioning by a retractor means;
D. Anchor means closely fitted and adapted to rotate within the concave upper surface of the arcuate finger portion and to be positioned and held by the hooking means and retractor means;
E. Retractor means adapted for retracting the hooking means; and
F. Attachment means for
  (1) fixed connection to at least one of the upper and at least one lateral surface of the base and adapted for
  (2) attachment to a gauge.

2. The device of claim 1 wherein the chain means is a bicycle type chain.

3. The tool means of claim 1 wherein the attachment means are clamped into position.

4. The tool means of claim 1 wherein the attachment means are screwed into holes within the base means.

5. The tool means of claim 1 wherein the attachment means are adapted to mark a surface.

6. The tool means of claim 1 wherein the attachment means are used to position an object.

* * * * *